United States Patent

Lyu

[19]

[11] Patent Number: 5,853,822
[45] Date of Patent: *Dec. 29, 1998

[54] LIQUID CRYSTAL DISPLAY AND MANUFACTURING METHOD THEREFOR

[75] Inventor: Jae-jin Lyu, Kyungki-do, Rep. of Korea

[73] Assignee: Samsung Electronics Co., Ltd., Kyungki-do, Rep. of Korea

[*] Notice: This patent issued on a continued prosecution application filed under 37 CFR 1.53(d), and is subject to the twenty year patent term provisions of 35 U.S.C. 154(a)(2).

[21] Appl. No.: 739,570

[22] Filed: Oct. 30, 1996

[30] Foreign Application Priority Data

Oct. 31, 1995 [KR] Rep. of Korea ............ 95-39036

[51] Int. Cl.$^6$ ................................................ G02F 1/1337
[52] U.S. Cl. ................. 428/1; 349/129; 349/124
[58] Field of Search .................. 428/1; 349/129, 349/124, 130, 132

[56] References Cited

U.S. PATENT DOCUMENTS 4,624,531  11/1986  Wada et al. ............... 349/129
4,878,742  11/1989  Ohkubo et al. ............ 349/129
5,638,201   6/1997  Bos et al. ................. 349/129

FOREIGN PATENT DOCUMENTS

2023865  1/1980  United Kingdom ........... 349/129

*Primary Examiner*—Alexander Thomas
*Attorney, Agent, or Firm*—Cushman Darby&Cushman IP Group of Pillsbury Madison & Sutro LLP

[57] ABSTRACT

A liquid crystal display and a manufacturing method thereof are provided. The liquid crystal display includes upper and lower substrates, electrodes on each of the upper and lower substrates such that the electrodes are facing each other, a first alignment layer formed on the upper and lower substrates and formed of a material which aligns perpendicular to a rubbing direction, and a second alignment layer pattern formed on the first alignment layer and formed of a material which aligns parallel to the rubbing direction. The method for manufacturing the liquid crystal display involves a process where pixels are divided into two halves or in single units, and then each pixel having different aligning directions can be performed through one rubbing step, so that the process is simplified and damage to the surfaces of alignment layers is reduced. Thus, the angle of visibility and display quality are enhanced.

12 Claims, 6 Drawing Sheets

LIQUID CRYSTAL DISPLAY AND MANUFACTURING METHOD THEREFOR

BACKGROUND OF THE INVENTION

The present invention relates to a liquid crystal display and a method for rubbing alignment layers thereof, and more particularly, to a liquid crystal display having alignment layers in which materials aligned perpendicular to and parallel to the rubbing direction are combined, to thereby enhance the angle of visibility, and a manufacturing method therefor.

Figure 1:
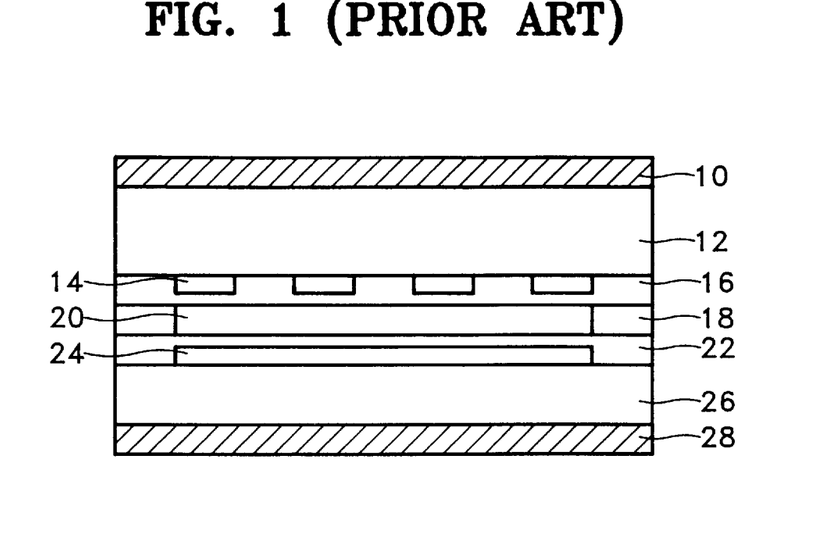
FIG. 1 is a sectional view of a conventional liquid crystal display (LCD)

A liquid crystal display (LCD) uses the property of liquid crystals in which optical anisotropy is changed when the LCD is subjected to an electrical field or heat. FIG. 1 is a sectional view of a conventional LCD. Electrodes 14 and 24 are formed on upper and lower substrates 12 and 26, and alignment layers 16 and 22, rubbed in a predetermined direction, are formed on transparent electrodes 14 and 24. Alignment layers 16 and 22 are sealed by sealant 18 to form internal space 20. Liquid crystal (not shown) is injected into the internal space 20. A twist direction of the liquid crystal is determined by the rubbing direction(s) on the surfaces of alignment layers 16 and 26. Polarizing plates 10 and 28 for polarizing incident light and transmitted light are formed on the outer surfaces of upper and lower substrates 12 and 26.

The angle of visibility of the LCD shown in FIG. 1 is determined mainly by the alignment of the liquid crystal molecules. The liquid crystal molecules are slim and long, wherein deflection of incident light on the liquid crystal molecules depends on the orientation thereof. That is the deflection of incident light from the short axis differs from the long axis. Accordingly, gray conversion and reduction in the angle of visibility are generated when a voltage is applied to transparent electrodes 14 and 24 of the LCD due to the orientation of the molecules according to the aligning directions.

In order to solve the above-mentioned problem, a method for forming an alignment layer having different alignments per unit pixel or half unit pixel has been proposed.

With reference to FIGS. 2 through 7, a method for forming an alignment layer having different alignments per pixel will be described. Reference numbers that are the same as those of FIG. 1 represent the same elements.

Figure 2:
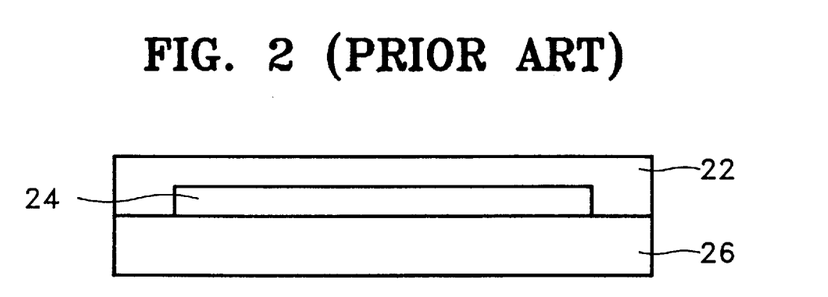
FIGS. 2 through 7 are sectional views showing the steps of forming alignment layers having different alignment directions in each pixel.
Figure 3:
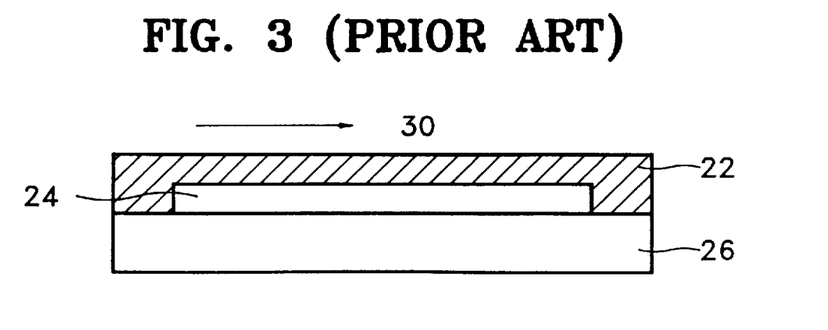
Figure 4:
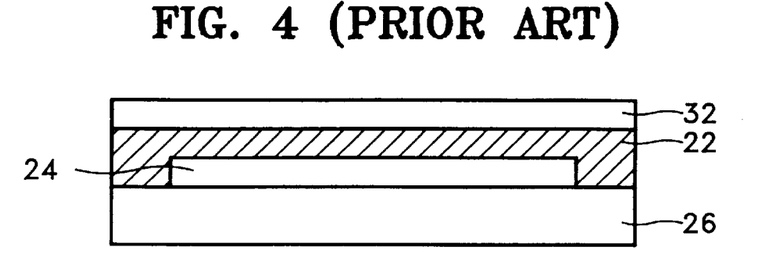
Figure 5:
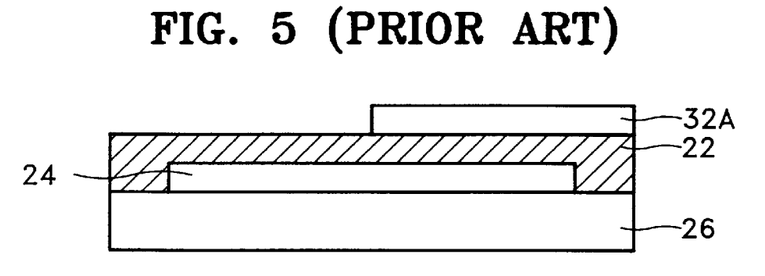
Figure 6:
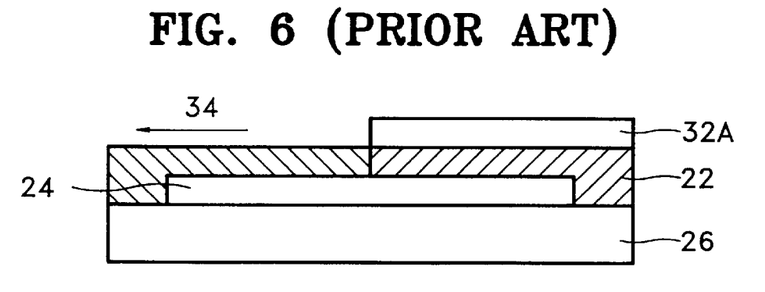
Figure 7:
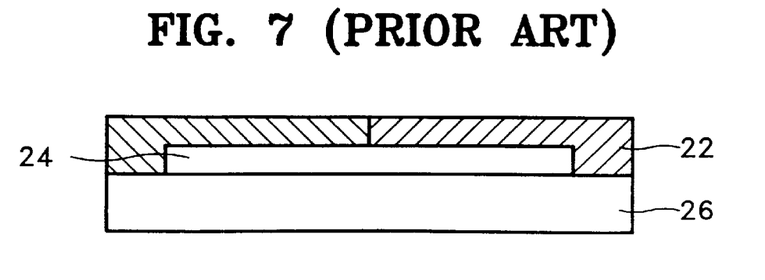

As shown in FIG. 2, alignment layer 22 is formed using a synthetic resin, selected from the group consisting of polyimide, polystyrene and polypyrrole, covering electrode 24. As shown in FIG. 3, alignment layer 22 is rubbed in a first direction 30 to form fine grooves. As shown in FIG. 4, photoresist layer 32 is formed on rubbed alignment layer 22. As shown in FIG. 5, part of photoresist layer 32 is removed by a photolithography process to thereby form a photoresist pattern 32A, exposing a portion of alignment layer 22. As shown in FIG. 6 exposed alignment layer 22 is rubbed in a second direction 34, and then photoresist pattern 32A is eliminated to thereby complete the LCD, as shown in FIG. 7.

In the above-described method of rubbing within a pixel unit, two rubbing processes must be performed to form alignment layers having different alignments. Accordingly, the entire process becomes complicated. Also, the surface of the alignment layer may be damaged during the photolithography process for eliminating part of the photoresist in order to perform rubbing in a second direction. Accordingly, in an LCD manufactured using the above-described method, alignment of the liquid crystal molecules is reduced thereby deteriorating display quality and reducing yield rate.

SUMMARY OF THE INVENTION

Accordingly, it is an object of the present invention to provide a liquid crystal display having an alignment layer which is formed of materials aligned perpendicular to and parallel to the rubbing direction, thereby enhancing the angle of visibility.

It is another object of the present invention to provide a method of manufacturing the above-described liquid crystal display.

To accomplish the first object of the present invention, there is provided a liquid crystal display comprising: upper and lower substrates; electrodes on each of the upper and lower substrates such that the electrodes are facing each other; first alignment layers formed on the upper and lower substrates and formed of a material which aligns perpendicular to a rubbing direction; and second alignment layers formed on the first alignment layers and formed of a material which aligns parallel to the rubbing direction.

Preferably, the first alignment layers are formed of one selected from the group consisting of polystyrene and derivatives thereof expressed by the following formulas:

wherein "R" represents $C_{1-5}$ alkyl and "X" represents a halogen.

To accomplish the first object of the present invention, there is also provided a liquid crystal display comprising: upper and lower substrates; electrodes formed on each of the upper and lower substrates such that the electrodes face each other; first alignment layers formed on the upper and lower substrates and formed of a material which aligns parallel to a rubbing direction; and second alignment layers formed on the first alignment layers and formed of a material which aligns perpendicular to the rubbing direction.

Preferably, the first alignment layers are formed of polyimide, and the second alignment layers are formed of one selected from the group consisting of polystyrene and derivatives thereof expressed by the above formula. The second alignment layers and exposed portions of the first alignment layer define pixels of the liquid crystal display, and the second alignment layers and the exposed portions of the first alignment layers form an alternating pattern.

To accomplish the first object of the present invention, there is also provided a liquid crystal display comprising: upper and lower substrates; electrodes formed on each of the upper and lower substrates such that the electrodes face each other; first alignment layers formed on the upper and lower substrates and formed of a material which aligns parallel to a rubbing direction; and second alignment layers formed on the upper and lower substrates and formed of a material which aligns perpendicular to the rubbing direction, such that the first alignment layers and the second alignment layers form a single layer in an alternating pattern.

Preferably, the first alignment layers are formed of polyimide, and the second alignment layers are formed of one selected from the group consisting of polystyrene and derivatives thereof expressed by the above formula. The first and second alignment layers define pixels of the liquid crystal display, or half pixels of the liquid crystal display, such that each pixel is comprised of one selected from a group consisting of a first alignment layer portion and a second alignment layer portion.

To accomplish the second object of the present invention, there is provided a method of manufacturing a liquid crystal display comprising the steps of: coating a substrate, having electrodes formed thereon, with a material which aligns perpendicular to a rubbing direction, thereby forming a first alignment layer; coating the first alignment layer with a material which aligns parallel to the rubbing direction, thereby forming a second alignment layer; forming a photoresist pattern on the second alignment layer; etching the second alignment layer using the photoresist pattern as an etching mask, thereby forming a second alignment layer pattern; eliminating the photoresist pattern; and rubbing the first alignment layer and second alignment layer pattern.

Preferably, the first alignment layer is formed of one selected from the group consisting of polystyrene and derivatives thereof expressed by the above formula.

To accomplish the second object of the present invention, there is also provided a method of manufacturing a liquid crystal display comprising the steps of: coating a substrate having electrodes formed thereon with a material which aligns parallel to a rubbing direction, thereby forming a first alignment layer; coating the first alignment layer with a material which aligns perpendicular to the rubbing direction, thereby forming a second alignment layer; forming a photoresist pattern on the second alignment layer; etching the second alignment layer using the photoresist pattern as an etching mask, thereby forming a second alignment layer pattern; eliminating the photoresist pattern; and rubbing the first alignment layer and second alignment layer pattern.

Preferably, the first alignment layer is formed of polyimide, and the second alignment layer is formed of one selected from the group consisting of polystyrene and derivatives thereof expressed by the above formula.

It is further preferable that the second alignment layer pattern defines the pixels of the liquid crystal display or half pixels thereof, and a second alignment layer pattern and a first alignment layer region exposed by the second alignment layer pattern alternate with each other.

To accomplish the second object of the present invention, there is provided a method of manufacturing a liquid crystal display comprising the steps of: coating a substrate having electrodes formed thereon with a material which aligns perpendicular to a rubbing direction, thereby forming a first alignment layer; forming a photoresist pattern on the first alignment layer; etching the first alignment layer using the photoresist pattern as an etching mask, thereby forming a first alignment layer pattern; coating the entire surface of the resultant structure with a material which aligns parallel to the rubbing direction, thereby forming a second alignment layer; eliminating the photoresist pattern and second alignment layer using a lift-off method, thereby forming a second alignment layer pattern alternating with the first alignment layer pattern; and rubbing the first and second alignment layer patterns.

Preferably, the first alignment layer is formed of one selected from the group consisting of polystyrene and derivatives thereof expressed by the above formula.

To accomplish the second object of the present invention, there is provided a manufacturing method of a liquid crystal display comprising the steps of: coating a substrate having electrodes formed thereon with a material which aligns parallel to a rubbing direction, thereby forming a first alignment layer; forming a photoresist pattern on the first alignment layer; etching the first alignment layer using the photoresist pattern as an etching mask, thereby forming a first alignment layer pattern; coating the entire surface of the resultant structure with material which aligns perpendicular to the rubbing direction, thereby forming a second alignment layer; eliminating the photoresist pattern and second alignment layer using a lift-off method, thereby forming a second alignment layer pattern alternating with the first alignment layer pattern; and rubbing the first and second alignment layer patterns.

Preferably, the first alignment layer is formed of polyimide, and the second alignment layer is formed of one selected from the group consisting of polystyrene and derivatives thereof expressed by the above formula.

It is preferable that the first and second alignment layer patterns define the pixels of the liquid crystal display or half pixels thereof, such that each pixel is comprised of a first alignment layer portion or a second alignment layer portion.

According to the present invention, a process of forming alignment layers having different directions can be performed through one rubbing, so that the process is simplified and damage to surfaces of the alignment layers is reduced. Thus, the angle of visibility and display quality are enhanced.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Figure 8:
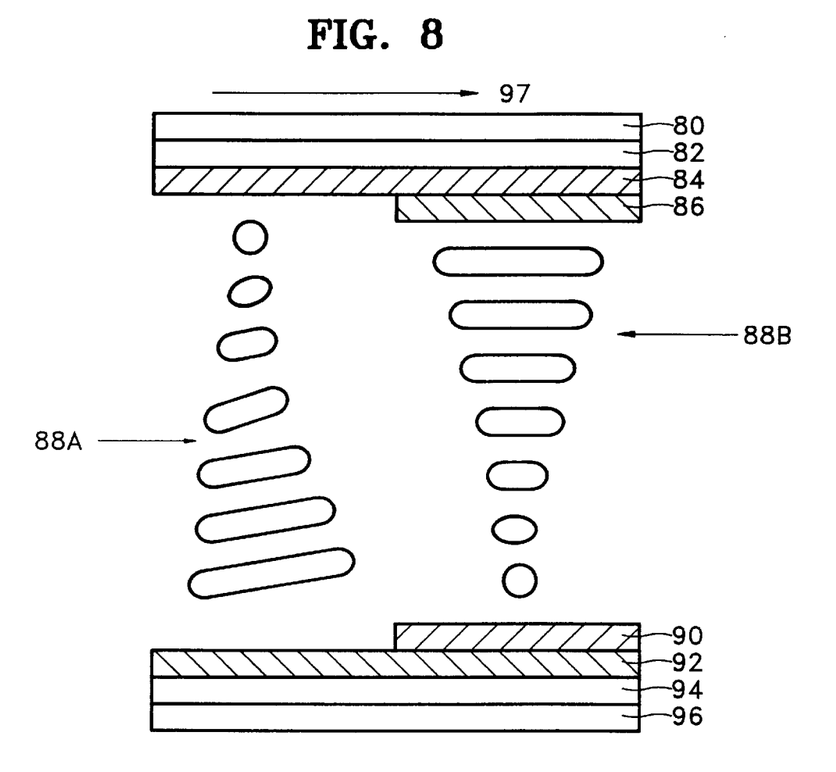
FIG. 8 is a sectional view of an LCD according to a first embodiment of the present invention.

As shown in FIG. 8, polarizing plates 80 and 96 are formed on the outer surfaces of upper and lower substrates 82 and 94, and first alignment layers 84 and 92 are formed on the inner surfaces thereof. Second alignment layer patterns 86 and 90, aligned perpendicular to an alignment direction of the first alignment layers, are formed on the inner surfaces of first alignment layers 84 and 92, respectively. In the case that first alignment layers 84 and 92 (or second alignment layer patterns 86 and 90) are formed of material aligned parallel to rubbing direction 97, i.e., polyimide, second alignment layer patterns 86 and 90 (or first alignment layers 84 and 92) are formed of one selected from the group consisting of material aligned perpendicularly to rubbing direction 97, i.e., polystyrene or derivatives thereof represented by the following formula.

Here, "R" represents $C_{1-5}$ alkyl, and "X" represents a halogen. It is also possible to combine the materials in a manner opposite to that described above.

It is desirable that second alignment layer patterns 86 and 90 correspond to a unit pixel or a half unit pixel. It is also desirable that second alignment layer patterns 86 and 90 alternate with the first alignment layer regions exposed by second alignment layer patterns 86 and 90.

Liquid crystal molecules 88A and 88B are injected into the space between upper and lower substrates 82 and 94. Since the alignment directions of first alignment layers 84 and 92 are different from that of second alignment layer patterns 86 and 90, the tilt angle of liquid crystal molecules 88A between first alignment layers 84 and 92 is different from that of liquid crystal molecules 88B between second alignment layers 86 and 90. Accordingly, compensation for the light incident on the liquid crystal display is generated due to liquid crystal molecules 88A and 88B having different tilt angles, thereby enhancing the angle of visibility.

Figure 9:
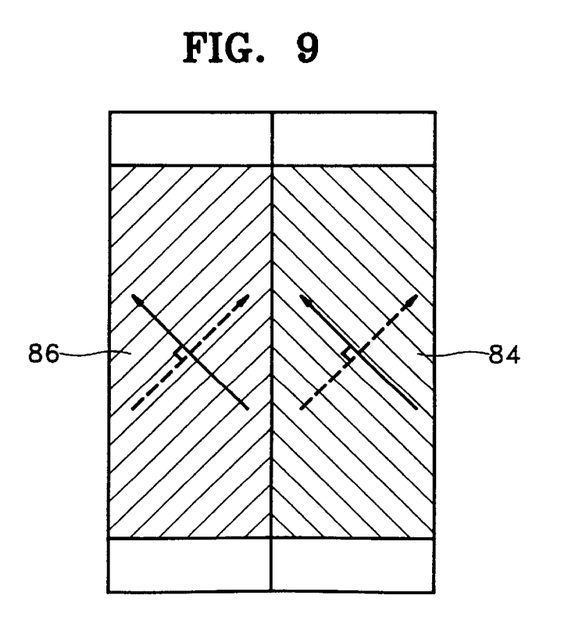
FIG. 9 is a schematic view showing a rubbing direction of an alignment layer according to the first embodiment of the present invention.

In FIG. 9, solid arrows represent the rubbing direction of upper substrate 82, and the dashed arrows represent rubbing direction of lower substrate 94. First alignment layer 84 is formed on the left side of the pixel and second alignment layer 86 is formed on the right side of the pixel. As shown in FIG. 8, first alignment layer 84 is formed of polyimide aligned parallel to rubbing direction 97, and second alignment layer 86 is formed of one selected from the group consisting of polystyrene and polystyrene derivatives, represented by formula (1), which are aligned perpendicular to rubbing direction 97. Therefore, alignment layers of 90° directions can be formed through one rubbing.

Figure 10:
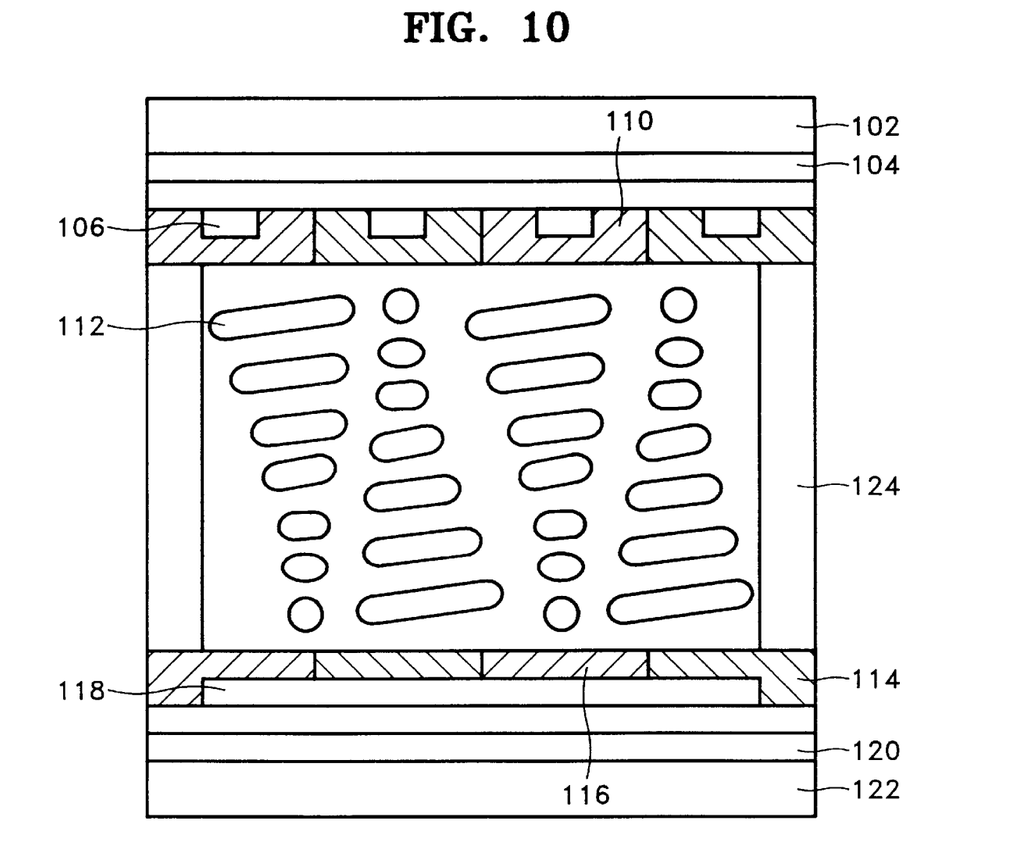
FIG. 10 is a sectional view of an LCD according to a second embodiment of the present invention.

As shown in FIG. 10, polarizing plates 102 and 122 are formed on the outer surfaces of upper and lower substrates 104 and 120. A plurality of first electrodes 106, arranged parallel to each other, are formed on the inner surface of upper substrate 104, and a plurality of second electrodes 118, arranged perpendicular to first electrodes 106, are formed on the inner surface of the lower substrate 120. In the second embodiment, unlike the first embodiment having a multilayered alignment structure in which the second alignment layer pattern is formed on the first alignment layer, the alignment layer has a single layer structure comprised of a second alignment layer formed of material aligned parallel to the rubbing direction of first alignment layer patterns 108 and 114, which is formed of material aligned perpendicular to the same rubbing direction. Further, space between upper and lower substrate 104 and 120 is filled with liquid crystal molecules 112 and sealed by sealant 124.

It is desirable that first alignment layer patterns 108 and 114 and second alignment layer patterns 110 and 116 correspond to a unit pixel or a half unit pixel. It is also desirable that first alignment layer patterns 108 and 114 alternate with second alignment layer patterns 110 and 116.

In the second embodiment, as in the first embodiment, an alignment direction of first alignment layer patterns 108 and 114 is perpendicular to that of second alignment layer patterns 110 and 116. Accordingly, since the tilt angles of the liquid crystal molecules differ when voltage is applied, the incident light is optically compensated, thereby enhancing the angle of visibility of the liquid crystal display device.

Figure 11:
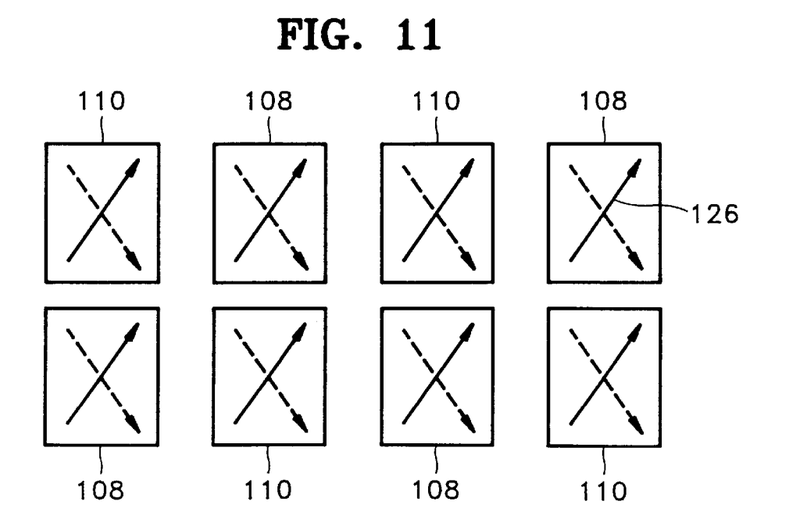
FIG. 11 is a schematic view showing a rubbing direction of an alignment layer according to the second embodiment of the present invention.

In FIG. 11, solid arrows 126 represent rubbing direction of upper substrate 104, and the dashed arrows represent the rubbing direction of lower substrate 120. First alignment layer pattern 108 is formed of polyimide aligned parallel to rubbing direction 126, and second alignment layer pattern 110 is formed of one selected from the group consisting of polystyrene and derivatives thereof, represented by formula (1), which is aligned perpendicular to the rubbing direction 126. That is, alignment layers forming an alignment direction of 90 degrees are alternated in a pixel unit. Accordingly, since the tilt angles of the liquid crystal molecules differ throughout the LCD, the angle of visibility is enhanced.

Figure 12:
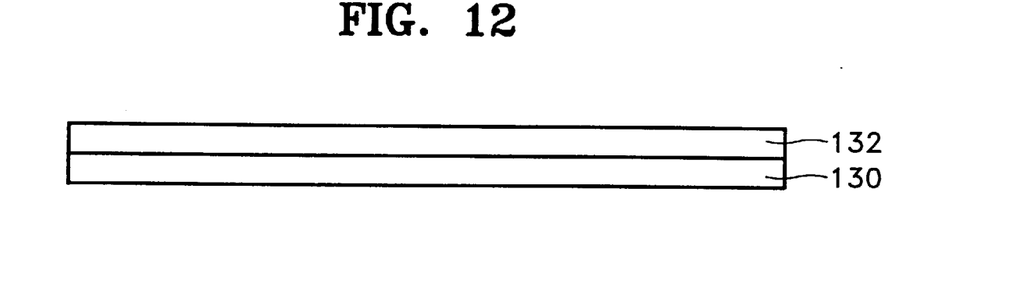
FIGS. 12 through 15 are sectional views showing a method of manufacturing the LCD according to the first embodiment of the present invention.

As shown in FIG. 12, the entire surface of substrate 130 such as glass, is coated with a transparent electrode film. Then, a transparent electrode pattern (not shown) is formed by photolithography. Next, first alignment layer 132 is formed of material, aligned parallel to the rubbing direction, such as polyimide and on the substrate where the transparent electrode pattern is formed.

Figure 13:
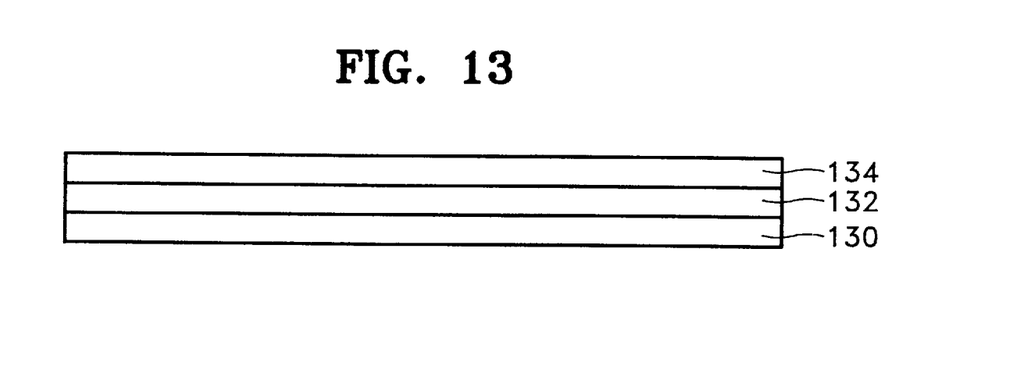

As shown in FIG. 13, second alignment layer 134 is formed of one selected from the group consisting of material, aligned perpendicular to the rubbing direction, such as polystyrene and derivatives thereof represented by formula (1).

Figure 14:
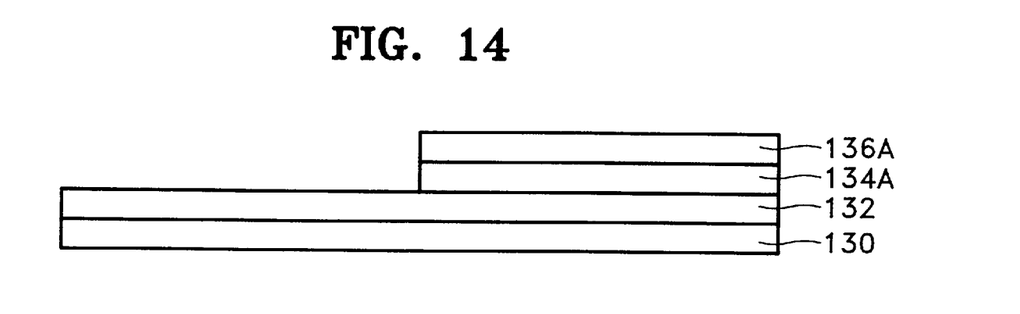

As shown in FIG. 14, photoresist is coated on second alignment layer 134, and then exposed, and the resultant structure is developed to form photoresist pattern 136A. Here, using photoresist pattern 136A as an etching mask, second alignment layer 134 is etched to form second alignment layer pattern 134A. Here, the surface of first alignment layer 132 is used as the etching stop point.

Figure 15:
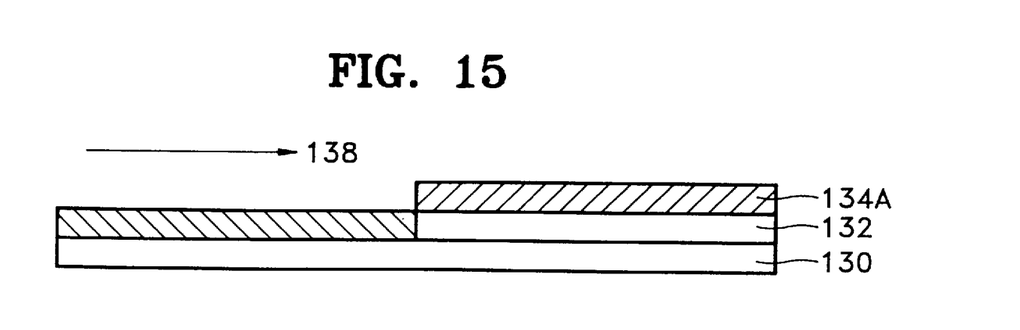

As shown in FIG. 15, photoresist pattern 136A is eliminated, and then surfaces of first alignment layer 132 and second alignment layer pattern 134A are rubbed in rubbing direction 138. Here, an angle of 90 degree is formed between the alignment directions of first alignment layer 132 and second alignment layer pattern 134A, through one rubbing.

It is desirable that second alignment layer pattern 134A corresponds to a region of a unit pixel or a region of a half unit pixel. It is also desirable that second alignment layer pattern 134A alternates with the first alignment layer 132 region exposed by second alignment layer pattern 134A.

Figure 16:
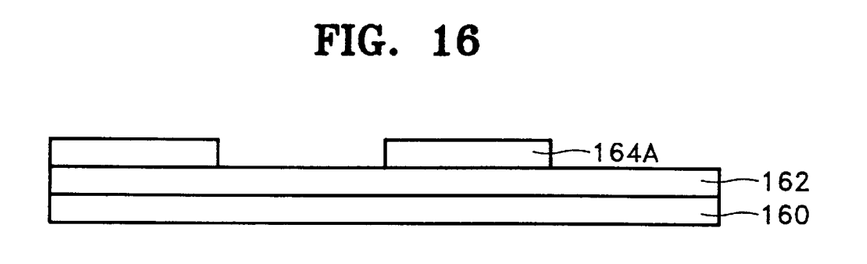
FIGS. 16 through 18 are sectional views showing a method of manufacturing the LCD according to the second embodiment of the present invention.

As shown in FIG. 16, a transparent electrode film is coated on the entire surface of substrate 160, such as soda glass, and then a transparent electrode pattern (not shown) is formed on the resultant structure by photolithography. Subsequently, on the substrate where the transparent electrode pattern is formed, material parallel with the rubbing direction such as polyimide is coated to form first alignment layer 162. Photoresist is coated on first alignment layer 162, and then exposed and developed to form photoresist pattern 164A.

Figure 17:
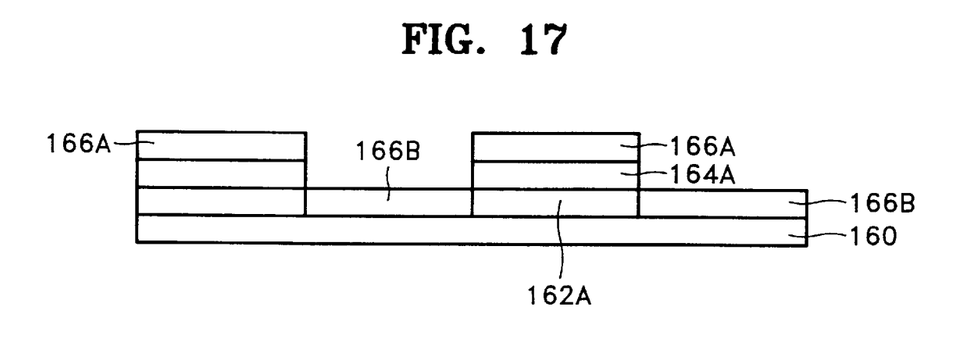

As shown in FIG. 17, first alignment layer 162 is etched using photoresist pattern 164A as an etching mask to form first alignment layer pattern 162A. Material aligned perpendicularly to the rubbing direction such as one selected from a group consisting of polystyrene and derivatives thereof, represented by formula (1), is coated on the resultant structure to form second alignment layers 166A and 166B.

Figure 18:
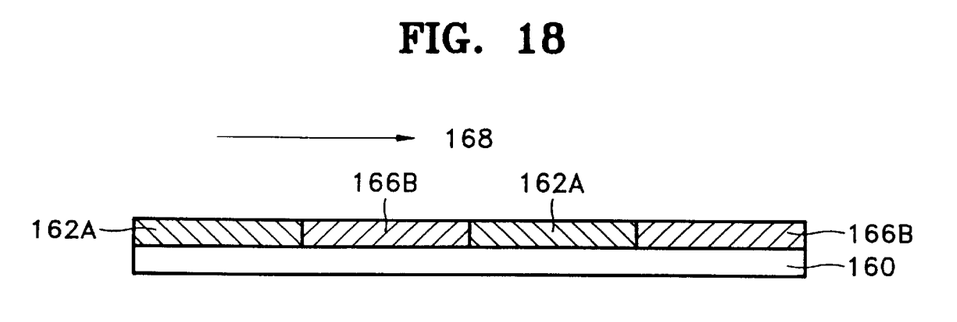

As shown in FIG. 18, when photoresist pattern 164A is eliminated by a lift-off method, second alignment layer 166A formed on photoresist pattern 164A is also eliminated. Subsequently, surfaces of first alignment layer 164A and second alignment layer 166B are rubbed in rubbing direction 168. Here, an angle of 90 degree is formed between the alignment directions of first alignment layer pattern 162A and second alignment layer pattern 166B through one rubbing.

It is desirable that first alignment layer pattern 162A and second alignment layer pattern 166B correspond to a region of a unit pixel or a region of a half unit pixel. It is also desirable that first alignment layer pattern 162A alternates with second alignment layer pattern 166B.

According to the LCD of the present invention, alignment layers having different alignment directions are formed by alternating a pixel unit or a half pixel unit. Accordingly, when voltage is applied to the electrodes, the tilt angles of the liquid crystal molecules is different due to anchoring energy of the alignment layer in a pixel unit or a half pixel unit. Accordingly, incident light of liquid crystal molecules having different tilt angles generates optical compensation so that the angle of visibility is enhanced, thereby enhancing display quality.

According to a method of manufacturing the liquid crystal display of the present invention, alignment layers of each different direction can be formed through one rubbing. Accordingly, the process is simplified. The process minimizes damage to surfaces of alignment layers, and prevents reduction in alignment of the liquid crystal molecules.

It should be understood that the present invention is not limited to the illustrated embodiment and that many changes and modifications can be effected by one skilled in the art, within the scope of the appended claims.

What is claimed is:

1. A liquid crystal display comprising:
   upper and lower substrates having electrodes formed thereon and facing each other;
   liquid crystal material held between said upper and lower substrates;
   a first alignment layer formed on said upper and lower substrates and formed of a material which aligns longer axes of molecules of said liquid crystal material parallel to each plane of said substrates and is aligned perpendicular to a rubbing direction; and
   a second alignment layer pattern formed on said first alignment layer and formed of a material which aligns longer axes of said molecules of liquid crystal material parallel to each plane of said substrates and is aligned parallel to said rubbing direction.

2. A liquid crystal display according to claim 1, wherein said second alignment layer pattern is formed of polyimide, and said first alignment layer is formed of one selected from the group consisting of polystyrene and derivatives thereof expressed by the following formula:

wherein "R" represents $C_{1-5}$ alkyl and "X" represents a halogen.

3. A liquid crystal display according to claim 1, wherein said second alignment layer pattern and portions of said first alignment layer exposed by said second alignment pattern define pixels, and said second alignment layer pattern and exposed portions of said first alignment layer alternate with each other.

4. A liquid crystal display according to claim 1, wherein said second alignment layer pattern and portions of said first alignment layer exposed by said second alignment layer define a half of each pixel, and said second alignment layer and exposed portions of said first alignment layer region alternate with each other.

5. A liquid crystal display comprising:
   upper and lower substrates having electrodes formed thereon and facing each other;
   liquid crystal material held between said upper and lower substrates;
   a first alignment layer formed on said upper and lower substrates and formed of a material which aligns longer axes of molecules of said liquid crystal material parallel to each plane of said substrates and is aligned parallel to a rubbing direction; and
   a second alignment layer pattern formed on said first alignment layer and formed of a material which aligns longer axes of molecules of said liquid crystal material parallel to each plane of said substrates and is aligned perpendicular to said rubbing direction.

6. A liquid crystal display according to claim 5, wherein said first alignment layer is formed of polyimide, and said second alignment layer pattern is formed of one selected from the group consisting of polystyrene and derivatives thereof expressed by the following formula:

wherein "R" represents $C_{1-5}$ alkyl and "X" represents a halogen.

7. A liquid crystal display according to claim 5, wherein said second alignment layer pattern and exposed portions of said first alignment layer define pixels, and said second alignment layer pattern and exposed portions of said first alignment layer alternate with each other.

8. A liquid crystal display according to claim 5, wherein said second alignment layer pattern and plurality of portions of said first alignment layer exposed by said second alignment layer pattern define a half of each pixel, and said second alignment layer pattern and exposed portions of said first alignment layer alternate with each other.

9. A liquid crystal display comprising:
   upper and lower substrates having electrodes formed thereon and facing each other;
   liquid crystal material held between said upper and lower substrates;
   a first alignment layer pattern formed on a plurality of first regions of said upper and lower substrates, and formed of a first alignment material which aligns longer axes of molecules of said liquid crystal material parallel to each plane of said substrates and is aligned parallel to a rubbing direction; and
   a second alignment layer pattern formed on a plurality of second regions alternating with said first regions, and formed of a second alignment material which is different than said first material and aligns longer axes of molecules of said liquid crystal material parallel to each plane of said substrates and is aligned perpendicular to said rubbing direction;

wherein said first alignment layer and said second alignment layer are arranged in the same plane and rubbed in said rubbing direction at the same time.

10. A liquid crystal display according to claim 9, wherein said first and second alignment layer patterns define pixels.

11. A liquid crystal display according to claim 9, wherein said first and second alignment layer patterns define a half of a pixel.

12. A liquid crystal display comprising:

upper and lower substrates having electrodes formed thereon and facing each other;

liquid crystal material held between said upper and lower substrates;

a first alignment layer pattern formed on a plurality of first regions of said upper and lower substrates, and formed of a first alignment material which aligns longer axes of molecules of said liquid crystal material parallel to each plane of said substrates and is aligned parallel to a rubbing direction; and a second alignment layer pattern formed on a plurality of second regions alternating with said first regions, and formed of a material which aligns longer axes of molecules of said liquid crystal material parallel to each plane of said substrates and is aligned perpendicular to said rubbing direction;

wherein said first alignment layer pattern and said second alignment layer pattern are arranged in the same plane; and said first alignment layer pattern is formed of polyimide, and said second alignment layer pattern is formed of one selected from the group consisting of polystyrene and derivatives thereof expressed by the following formula:

wherein "R" represents $C_{1-5}$ alkyl and "X" represents a halogen.

* * * * *